April 12, 1955 N. CORSINI 2,706,010
STEERING MEANS FOR HEAVY DUTY VEHICLES
Filed May 24, 1952 3 Sheets-Sheet 1
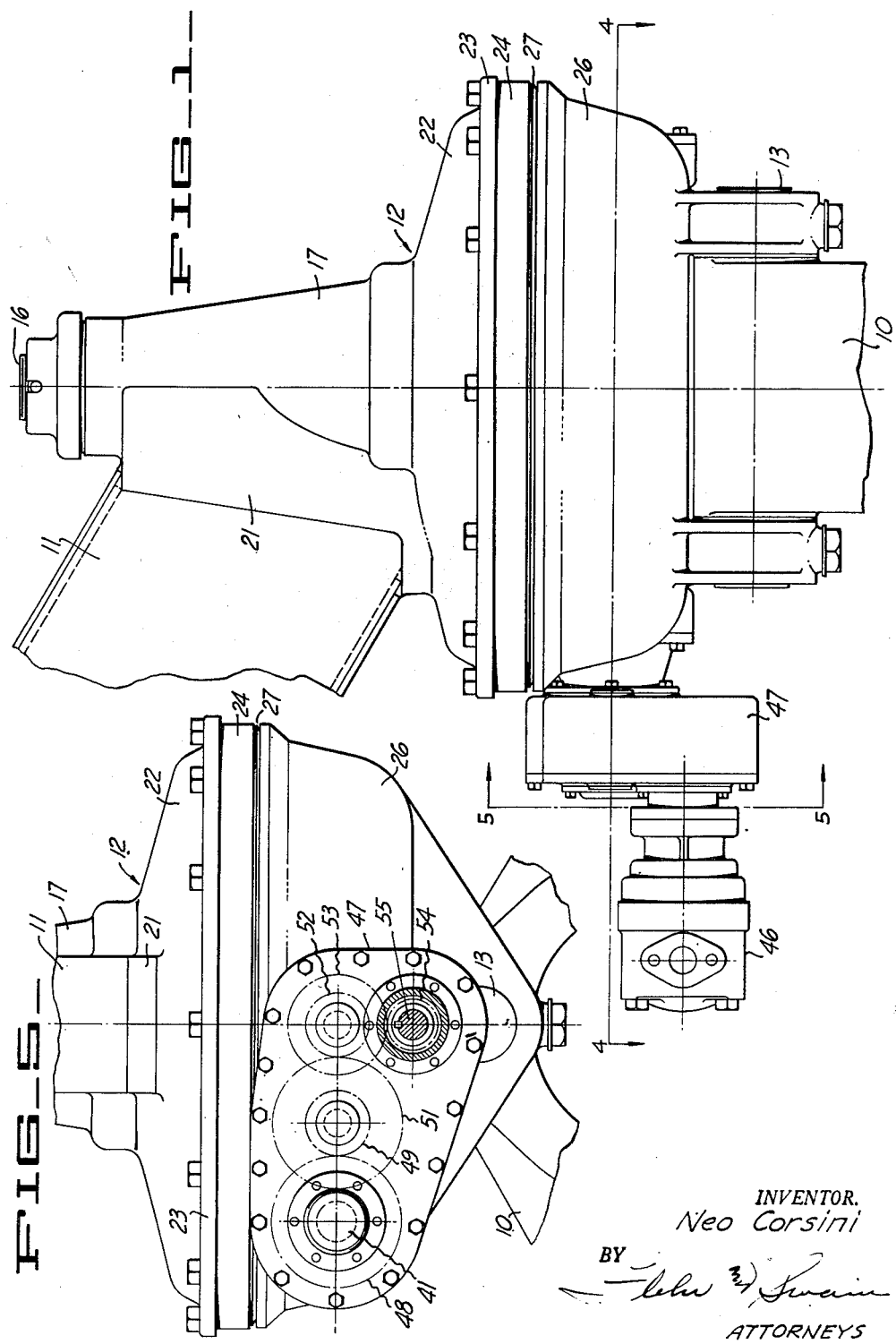
INVENTOR.
Neo Corsini
BY
ATTORNEYS

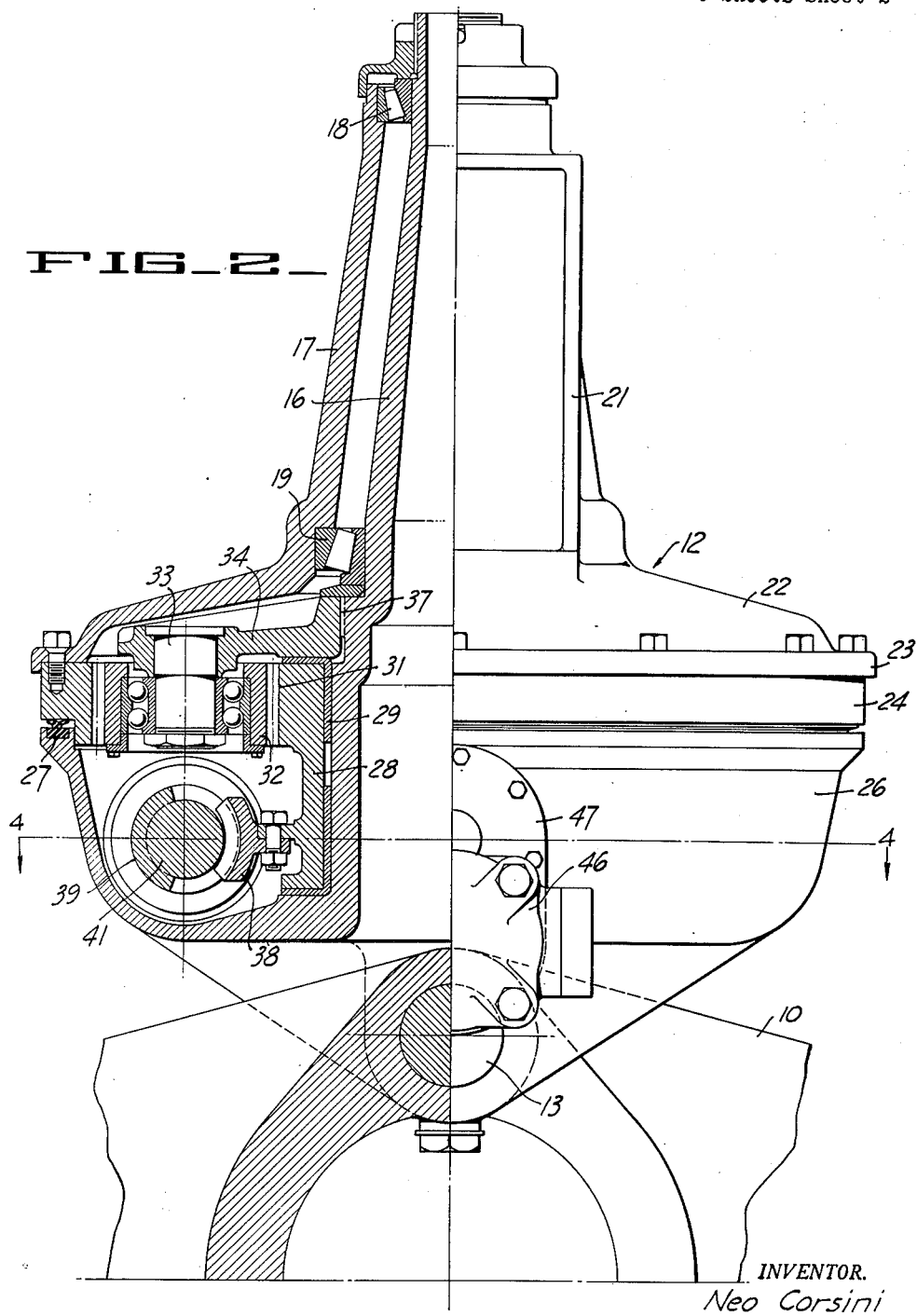

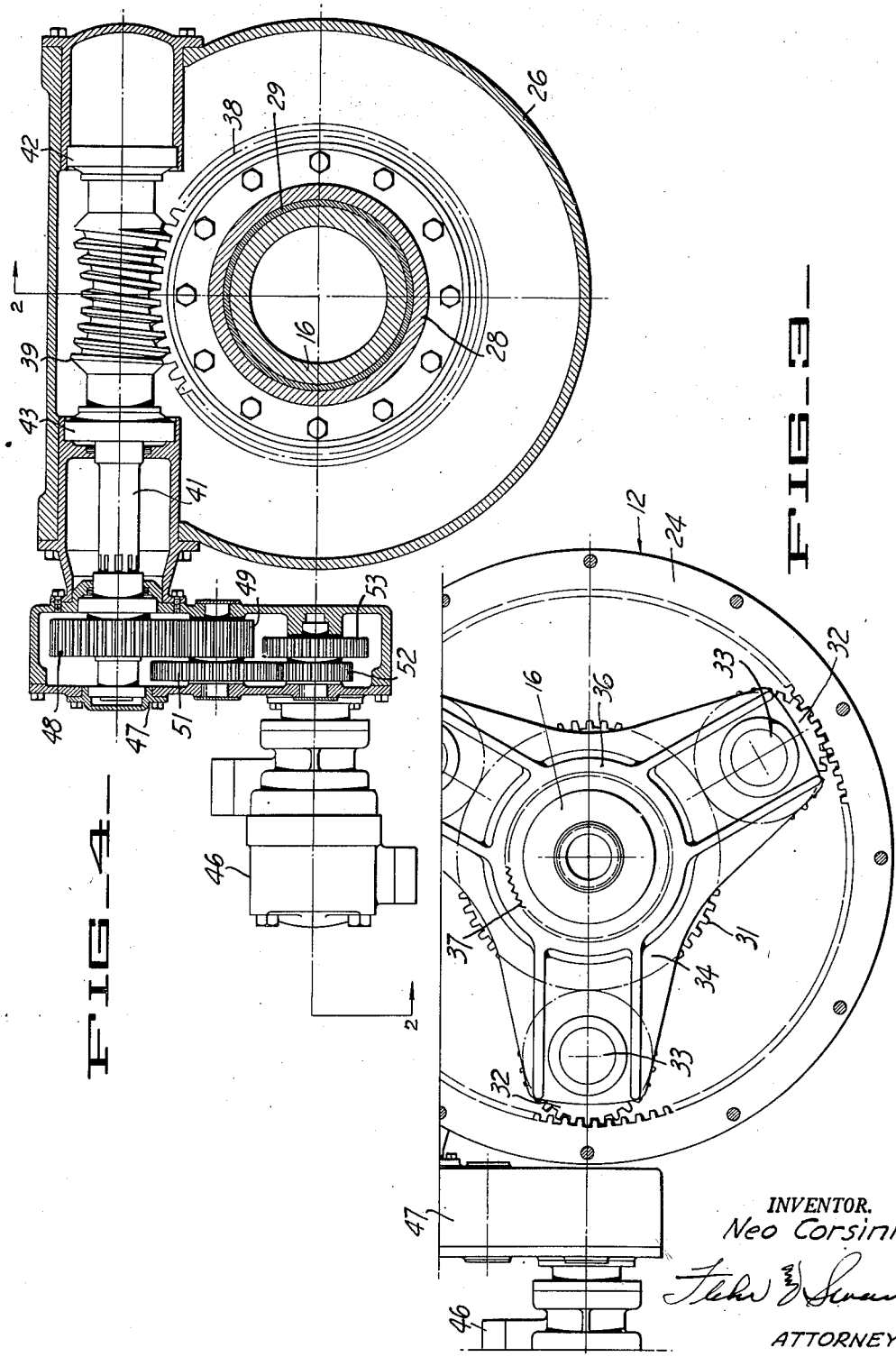

United States Patent Office 2,706,010
Patented Apr. 12, 1955

2,706,010

STEERING MEANS FOR HEAVY DUTY VEHICLES

Neo Corsini, Sunnyvale, Calif., assignor to Wooldridge Manufacturing Company, Sunnyvale, Calif., a corporation of Nevada Application May 24, 1952, Serial No. 289,833

3 Claims. (Cl. 180—79.4)

This invention relates generally to power steering means for heavy duty vehicles, as for example earth movers of the type disclosed in Clark Reissue 23,251.

It is an object of the present invention to provide steering means of the above character capable of relatively rapid steering action.

Another object of the invention is to provide improved power steering means of the above character in which the working parts are completely enclosed.

Another object of the invention is to provide power steering means of the above character in which the principal gear elements are assembled in a novel manner in conjunction with parts of the king pin assembly.

Additional objects and features of the invention will appear from the following description in which the preferred embodiment of the invention has been set forth in detail in conjunction with the accompanying drawing.

Referring to the drawing:

Figure 1 is a side elevational view illustrating a king pin assembly and power steering means for the same, in accordance with the present invention.

Figure 2 is a front view of the invention as illustrated in Figure 1, with certain parts being broken away to illustrate parts of the enclosed gearing.

Figure 3 is a plan view of Figure 2, but with the hub removed to illustrate the enclosed parts of the gearing.

Figure 4 is a cross-sectional view taken along the line 4—4 of Figure 2, and serving to illustrate the gear elements connected to the fluid motor.

Figure 5 is a detail illustrating the mounting of the fluid motor upon parts of the gear housing.

As previously mentioned, the present invention is particularly adapted for use with heavy duty land vehicles, as for example earth movers which have a forward motor powered tractor, and a rear trailer coupled to the frame of the tractor by means of a king pin assembly. Assuming that the tractor is provided with two wheels driven through the customary transmission and differential gearing, power steering forces applied between the frames of the tractor and trailer serve to turn the tractor to the desired steering angle.

For simplicity the drawing illustrates only certain parts of the tractor and trailer. Member 10 represents a cross beam forming a part of the tractor frame, and member 11 is a gooseneck which extends forwardly from and is a part of the trailer frame. The king pin assembly 12 serves to couple the tractor and trailer for steering movements about a vertical axis. A horizontal pin 13 serves to connect the king pin assembly to the cross beam 10, thus permitting the tractor to oscillate about a horizontal axis in a manner disclosed in Clark Reissue 23,251. The means for applying steering forces between the trailer and tractor frames makes use of certain gear elements which are incorporated in the king pin assembly.

To describe the king pin assembly 12 in greater detail, it consists of an inner king pin 16 which may be hollow as illustrated, and which at its lower end is attached to the pin 13. A hub 17 surrounds the pin 16 and is journaled to the same by suitable means such as the roller bearing assemblies 18 and 19. The trailer frame member 11 is rigidly secured by suitable means, such as a weld connection, to the portion 21 of the hub.

The lower end of the hub 17 is provided with a flared portion 22 which provides a peripheral flange or margin 23 for attaching the same to a ring gear 24. This gear is internally toothed, and its outer peripheral margin is interposed between the flange 23 and the housing 26, the latter being attached to the lower end of the king pin. Suitable sealing means 27 can be interposed between the gear 24 and the housing 26.

A sleeve 28 surrounds the base of the king pin and is journaled thereto by the journal bushing 29. The upper portion of the sleeve 28 forms the externally toothed gear 31. A plurality of circumferentially spaced gear pinions 32 are positioned about the gear 31, and engage the teeth of both gears 31 and 24.

The pins 33 on which the pinions are journaled are carried by the circumferentially spaced arms 34, and these arms are secured to the hub 36. The hub is provided with a suitable spline connection 37 to the king pin 16.

The lower end of the sleeve 28 carries a worm gear 38, which is adapted to engage the worm 39. A shaft 41 serves to carry the worm, and is journaled within the housing 26, as by means of the roller bearing assemblies 42 and 43.

It will be evident that when the worm 39 is rotated, the worm gear 38 together with sleeve 28 are rotated about the axis of the king pin, whereby rotation of the gear 31 causes rotation of the pinions 32. Rotation of these pinions transmits rotation to the outer ring gear 24, and this in turn is applied to the hub 17. Actually the hub 17 remains stationary, and the housing 26, together with the king pin 16, rotate about a vertical axis.

The drive means illustrated for the shaft 41 consists of a suitable reversible motor 46, which is connected to the shaft 41 through suitable speed reduction gearing 47. The motor is preferably one of the hydraulic fluid operated type, although an electric motor can be used if desired. The gearing may include the gear 48 keyed to the shaft 41 and engaging the pinion 49, the gear 51 which is geared to the pinion 49 and which engages the pinion 52, and the gear 53 which is secured to pinion 52, and which engages a pinion 54 on the shaft 55 of the motor 46.

Assuming that the motor 46 is of the fluid operated type, it is connected to a suitable hydraulic system mounted upon the tractor, and including a hydraulic pump operated by the tractor engine. A suitable control valve operated by the steering wheel or tiller of the tractor, makes it possible to apply hydraulic liquid to the motor for operating the same in either direction.

The general operation of my apparatus is as follows: Depending upon the direction of drive of the motor, the worm 39 is turned to actuate the gearing which includes the gears 24 and 31, and the pinions 32. The net effect is to cause relative rotation between the hub 17 and the king pin 16, or in other words between the frames of the trailer and tractor. Thus the tractor can be turned to any desired steering angle with respect to the trailer.

It will be evident that my apparatus has many desirable features. All of the operating gears are completely enclosed. The principal parts of the gearing employed are assembled in conjunction with the king pin assembly, and they are enclosed between the flared portion 22 of the hub, and the housing 26, which is attached to the king pin. That part of the gearing which must withstand the greatest torque and highest shock forces, namely gears 24 and 31 and pinions 32, can be made relatively strong, and the tooth pressures are evenly distributed over a plurality of areas. Because of the manner in which the gearing is enclosed it is a simple matter to maintain it properly lubricated.

I claim:

1. In a vehicle of the type described including a motor-powered tractor and a trailer adapted to be coupled to the tractor for steering movements of the tractor about a vertical steering axis, a king pin assembly including a hub attached to the trailer frame and a vertical king pin connected to the tractor and journalled within the hub for steering movements about a vertical axis, the lower portion of the hub being flanged outwardly, a housing secured to the lower portion of the king pin and enclosing the space below said flanged portion, an internally toothed ring gear concentric with said axis and secured to the margin of said flanged portion, an externally toothed gear concentric with the first gear and journalled for rotation about the king pin, a hub keyed to said king pin, a plurality of arms fixed to said last named hub, a plurality of pins mounted in the outer extremity of said arms, a plurality of pinions rotatably mounted on said pins, said pinions being disposed between said gears and engaging the teeth of the same, a worm gear journalled for rotation about the king pin and directly secured to said second named gear, a worm disposed in said housing and engaging said worm gear, and means exterior of the housing for driving said worm in either direction.

2. In the vehicle of the type described including a motor-powered tractor and a trailer adapted to be coupled to the tractor for steering movements of the tractor about a vertical steering axis, a king pin assembly including a hub attached to the trailer frame and a vertical king pin connected to the tractor and journalled within the hub for steering movements about a vertical axis, the lower portion of the hub being flanged outwardly, a housing secured to the lower portion of the king pin and enclosing the space below said flanged portion, an internally toothed ring gear concentric with said axis and secured to the margin of said flanged portion, a sleeve concentric with the first gear journalled for rotation about the lower portion of said king pin, an externally toothed gear formed on the upper portion of said sleeve, a hub keyed to said king pin, a plurality of arms fixed to said last named hub, a plurality of pins mounted on the outer extremities of said arms, a plurality of pinions rotatably mounted on said pins, said pinions being disposed between said gears and engaging the teeth of the same, a worm gear fixed to the lower portion of said sleeve, a worm disposed in said housing and engaging said worm gear, a shaft extending laterally into said housing and keyed to said worm, and driving motive means connected to said shaft exterior of the housing for driving said shaft in either direction.

3. A device as in claim 2 in which said motive means is mounted on said housing.

References Cited in the file of this patent

UNITED STATES PATENTS

| | | |
|---|---|---|
| 2,400,218 | Akers | May 14, 1946 |
| 2,494,738 | Booth | Jan. 17, 1950 |